United States Patent [19]

Emmons et al.

[11] Patent Number: 5,588,087
[45] Date of Patent: Dec. 24, 1996

[54] OVERLAPPING FUSION ATTENUATOR

[75] Inventors: David J. Emmons, Plymouth; Liang-Ju Lu, Eden Prairie, both of Minn.

[73] Assignee: ADC Telecommunications, Inc., Minneapolis, Minn.

[21] Appl. No.: 306,241

[22] Filed: Sep. 14, 1994

Related U.S. Application Data

[63] Continuation of Ser. No. 205,342, Mar. 8, 1994, abandoned, which is a continuation of Ser. No. 582, Jan. 4, 1993, abandoned, which is a continuation of Ser. No. 815,963, Jan. 2, 1992, abandoned.

[51] Int. Cl.⁶ ........................................ G02B 6/26
[52] U.S. Cl. .............................. 385/140; 385/96
[58] Field of Search ............................ 385/140, 96

[56]  References Cited

U.S. PATENT DOCUMENTS

| | | | |
|---|---|---|---|
| 3,981,561 | 9/1976 | Weiss et al. | 350/160 P |
| 4,054,366 | 10/1977 | Barnoski et al. | 385/48 |
| 4,142,126 | 2/1979 | DuBois | 313/497 |
| 4,257,671 | 3/1981 | Barbaudy et al. | 350/96.15 |
| 4,261,640 | 4/1981 | Stankos et al. | 350/96.15 |
| 4,378,490 | 3/1983 | d'Auria Luigi | 250/201 |
| 4,516,827 | 5/1985 | Lance et al. | 350/96.15 |
| 4,529,262 | 7/1985 | Ashkin et al. | 350/96.15 |
| 4,557,556 | 12/1985 | Decker, Jr. | 385/140 |

(List continued on next page.)

FOREIGN PATENT DOCUMENTS

| | | |
|---|---|---|
| 1185469 | 10/1981 | Canada . |
| 74499 | 8/1982 | European Pat. Off. . |
| 83301072 | 3/1983 | European Pat. Off. . |
| 0093460 | 11/1983 | European Pat. Off. ........ G02B 7/26 |
| 144136 | 10/1984 | European Pat. Off. . |
| 404587 | 6/1990 | European Pat. Off. . |
| 411350 | 7/1990 | European Pat. Off. . |
| 2533323 | 9/1982 | France . |
| 2598820 | 5/1986 | France . |
| 157633 | 3/1981 | German Dem. Rep. . |
| 3042587 | 11/1980 | Germany . |
| 3419733 | 5/1984 | Germany . |
| 3528285A1 | 2/1987 | Germany . |
| 59-55649 | 3/1984 | Japan . |
| 59-127003 | 7/1984 | Japan . |
| 61-26003 | 2/1986 | Japan . |
| 62-10935 | 1/1987 | Japan . |
| 63-39223 | 2/1988 | Japan . |
| 2042402 | 2/1990 | Japan . |
| 2-281224 | 11/1990 | Japan . |

(List continued on next page.)

OTHER PUBLICATIONS

United States Statutory Invention Registration No. H491 published Jul. 5, 1988 to Pitruzzello et al. teaches a fiber optic attenuator.

Dec. 1, 1992 Search Report for PCT/US92/07342 and the following references cited in the Search Report (U.S. Patent No. 5,037,176 was cited in the Search Report and is item 1 of this Statement.).

Nov. 30, 1992 Search Report for PCT/US92/07247 and the following references cited in the Search Report (U.S. Patent No. 4,557,557 was cited in the Search Report and is item 18 of the Statement).

*Primary Examiner*—John D. Lee
*Attorney, Agent, or Firm*—Merchant, Gould, Smith, Edell, Welter, & Schmidt

[57]  ABSTRACT

A method for fabricating an optical attenuator from first and second optical fibers includes placing the fibers in closely spaced overlapped relation to define an overlapped portion of the fibers. Energy is initially applied to the overlapped portion to at least partially fuse the first and second fibers at the overlapped portion.

32 Claims, 3 Drawing Sheets

5,588,087

Page 2

U.S. PATENT DOCUMENTS

| | | | |
|---|---|---|---|
| 4,557,557 | 12/1985 | Gleason et al. | 385/140 |
| 4,591,231 | 5/1986 | Kaiser et al. | 350/96.18 |
| 4,639,078 | 1/1987 | Sheem | 350/96.21 |
| 4,644,145 | 2/1987 | Gundner | 250/201 |
| 4,645,294 | 2/1987 | Oguey et al. | 350/96.15 |
| 4,692,610 | 9/1987 | Szuchy | 250/227 |
| 4,695,125 | 9/1987 | Sinclair et al. | 350/96.20 |
| 4,702,549 | 10/1987 | Duck et al. | 350/96.15 |
| 4,728,170 | 3/1988 | Robertson | 350/96.15 |
| 4,747,673 | 5/1988 | Marrs et al. | 350/372 |
| 4,749,257 | 6/1988 | Klausz | 350/331 R |
| 4,787,700 | 11/1988 | Yin | 350/96.21 |
| 4,878,730 | 11/1989 | Wall | 350/96.21 |
| 4,881,793 | 11/1989 | Tarbox | 350/96.21 |
| 4,884,859 | 12/1989 | Yamamoto et al. | 350/96.15 |
| 4,893,889 | 1/1990 | Iwakiri et al. | 350/96.15 |
| 4,904,044 | 2/1990 | Tamulevich | 350/96.18 |
| 5,031,994 | 7/1991 | Emmons | 350/96.20 |
| 5,037,176 | 8/1991 | Roberts et al. | 385/16 |
| 5,066,094 | 11/1991 | Takahashi | 385/73 |
| 5,285,516 | 2/1994 | Wong | 385/140 |

FOREIGN PATENT DOCUMENTS

| | | |
|---|---|---|
| 1066948 | 7/1982 | U.S.S.R. . |
| 1118944 | 3/1983 | U.S.S.R. . |
| 1151906 | 9/1983 | U.S.S.R. . |
| 1300303 | 3/1987 | U.S.S.R. . |
| 1300306 | 3/1987 | U.S.S.R. . |
| 1381410 | 3/1988 | U.S.S.R. . |
| 1408409 | 7/1988 | U.S.S.R. . |
| 1437823 | 11/1988 | U.S.S.R. . |
| 2074339 | 4/1980 | United Kingdom . |
| 2088578 | 6/1982 | United Kingdom . |
| 2128766 | 10/1982 | United Kingdom . |
| 2138161 | 4/1983 | United Kingdom . |
| 2140167 | 5/1984 | United Kingdom . |
| 2162113 | 7/1984 | United Kingdom . |
| 2190211 | 5/1986 | United Kingdom . |
| 2192070 | 5/1987 | United Kingdom . |

OVERLAPPING FUSION ATTENUATOR

The present application is a continuation of U.S. patent application Ser. No. 08/205,342 filed Mar. 8, 1994 (and now abandoned), as a continuation of Ser. No. 08/000,582 filed Jan. 4, 1993 (now abandoned), which is a continuation of Ser. No. 07/815,963 filed Jan. 2, 1992 (now abandoned), priority of the present application being made to Jan. 2, 1992.

I. BACKGROUND OF THE INVENTION

1. Field of the Invention

This invention pertains to a fiber optic attenuator for use in attenuating a signal transmitted over optical fibers.

2. Description of the Prior Art

The use of in-line optical fiber attenuators is well known. Examples of such are shown in U.S. Pat. Nos. 4,529,262; 4,557,557; and 4,557,556.

It is desirable to provide for a method for fabricating a low cost optical fiber attenuator. Furthermore, such a method should be susceptible to producing a variety of attenuators which will produce a variety of desired signal losses. It is an object of the present invention to provide a method of fabricating a low cost attenuator which is susceptible to fabricating attenuators of a wide variety of signal losses.

II. SUMMARY OF THE INVENTION

According to a preferred embodiment of the present invention, a method is disclosed for fabricating an optical attenuator from at least a first and second optical fiber. The method includes the steps of placing the first and second fibers in closely spaced overlapping relation to define an overlapped portion of the fibers. Energy is applied to the overlapped portion to at least partially fuse the first and second fibers at the overlapped portion.

III. BRIEF DESCRIPTION OF THE DRAWINGS

IV. DETAILED DESCRIPTION OF THE PREFERRED EMBODIMENT

Figure 1:
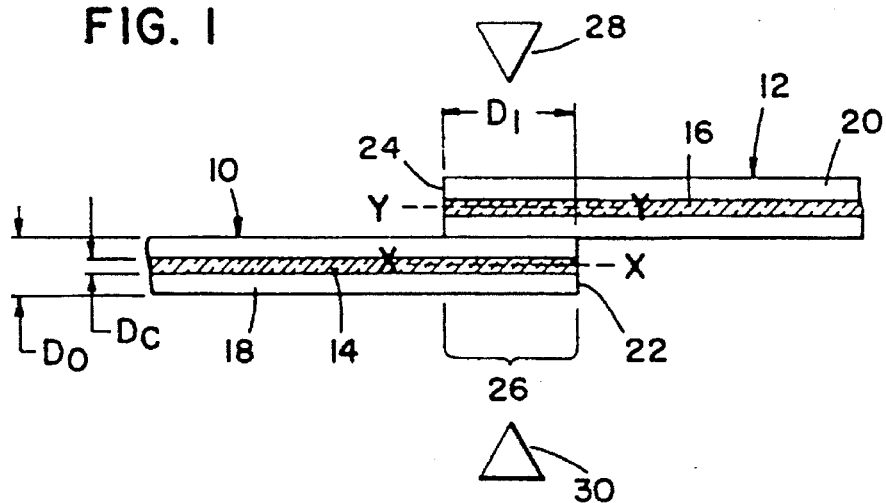
FIG. 1 is a sectional view of two fibers disposed for fusion according to the method of the present invention.

Referring now to FIG. 1, optical fibers 10 and 12 are shown in preparation for fusion according to the method of the present invention. Each of fibers 10,12 include a signal transmitting core 14,16 surrounded by a cladding 18,20. The fibers terminate at terminal ends 22,24. The fibers 10,20 are of commercial construction and have an outside diameter $D_0$ of about 0.125 millimeters. The cores of each of the fibers have a diameter $D_C$ of about 0.010 millimeters for single mode fibers and about 0.050 millimeters for multi-mode fibers. The fibers 10,12 are connected to signal sources and receivers (not shown) such that an optical signal can be sent through the fibers 10,12 and the transmission loss through the fibers 10,12 can be measured during the method of the present invention.

As shown in FIG. 1, the fibers 10,12 are disposed in parallel side-by-side abutting and overlapping relation. Specifically, as shown in FIG. 1, the axis X—X of fiber 10 is disposed in parallel and spaced apart alignment from the axis Y—Y of fiber 12. The cladding 18 of fiber 10 abuts the cladding 20 of fiber 12. As a result, the fibers cooperate to define an overlapped portion 26 having a length $D_1$ which, in a preferred embodiment, is about 0.5 millimeters.

As shown in FIG. 1, the overlapped portion 26 is disposed between the electrodes 28,30 of an electrical arc generator. The complete generator is not shown and is a commercially available item to produce an arc between electrodes 28,30. In a preferred embodiment, the generator will produce an arc having a current flow of about 0.05 to 0.06 amps between electrodes 28,30. The arc produced by the electrodes 28,30 is an energy source for fusing the fibers, as will be described. It will be appreciated by those skilled in the art that any energy source could be used. Examples of alternative energy sources would be lasers or other heat sources.

Figure 2:
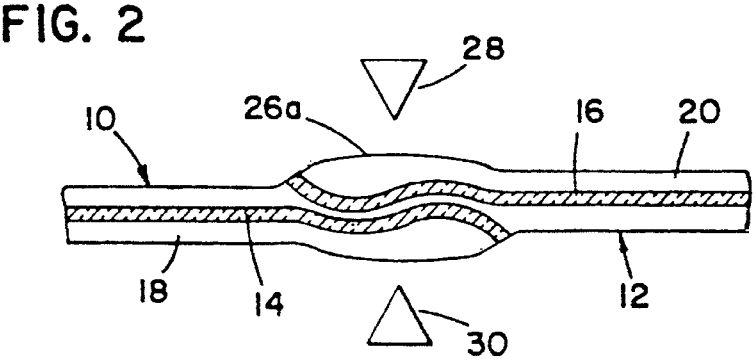
FIG. 2 is a view of the fibers of FIG. 1 after application of energy to the overlapped portion of the fibers.

In the method of the present invention, the electrodes 28,30 are energized to create a pulse arc of about one second duration to apply energy to the overlapped portion 26. By reason of the application of this energy, the cladding 18,20 partially melt and fuse together as shown in FIG. 2, such that the fibers 10,20 are now joined by a fused overlapped portion 26a.

After the initial fusion, the amount of signal transmission loss through the now coupled fibers 10,12 is measured. If the transmission loss is greater than a desired loss for an attenuator to be produced according to the present fabrication technique, a subsequent application of energy is supplied to portion 26a by passing a further arc between electrodes 28,30. The subsequent application of energy causes further fusing of the overlapped portion 26a. As a result of this further fusing, the cores 14,16 in region 26a move closer together resulting in reduced transmission loss. Accordingly, multiple fuses results in the cores 14,16 moving progressively together with a resulting progressive decrease in the amount of transmission loss through the fibers 10,12.

As a result, the method of the present invention, includes application of energy to the overlapped portion 26 to at least partially fuse the fibers 10,12 in the overlapped portion 26. Following the application of energy, transmission loss through the fibers 10,12 is measured. If the transmission loss is greater than a desired transmission loss, subsequent applications of energy are applied. After each application of energy, the transmission loss through the fibers 10,12 is measured. The subsequent applications of energy followed by subsequent measurements of the transmission loss is continued until a desired transmission loss is attained.

From the foregoing, it can be seen how an attenuator of varying transmission losses can be attained. For example, transmission losses of 12,15 or 20 dB (or any other dB greater than 10 dB) can be attained simply by controlling the amount or number of applications of energy to the overlapped portion 26.

Figure 3:
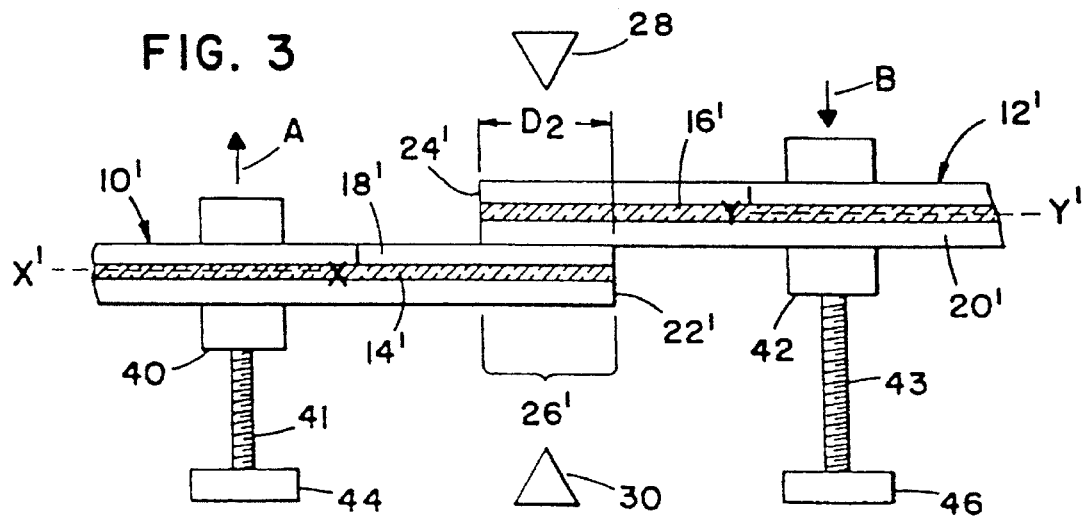
FIG. 3 is a schematic diagram of an apparatus and optical fibers set up for fabrication according to a further alternative embodiment of the present invention.
Figure 4:
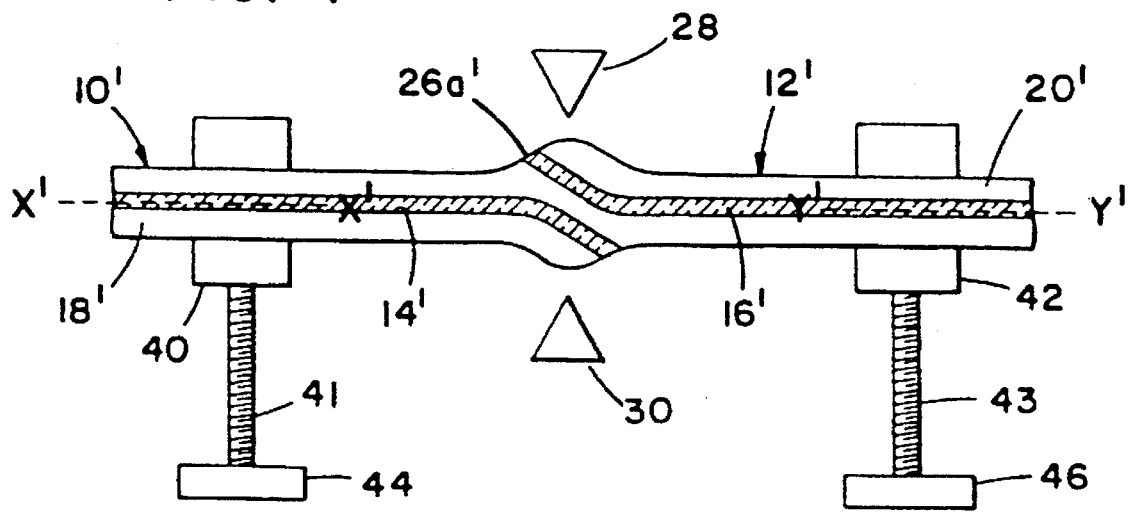
FIG. 4 is the view of FIG. 3 Showing the fibers after fusion.

The foregoing preferred embodiment is adequate for producing attenuators having transmission losses of greater than or equal to 10 dB. With reference to FIGS. 3 and 4, an alternative embodiment to the present invention is shown for fabricating attenuators having losses less than 10 dB (but normally greater than 5 dB).

In FIG. 3, fibers 10',12' are shown. It will be appreciated that fibers 10',12' are identical in every respect to fibers 10 and 12 of FIGS. 1 and 2. Accordingly, a detailed description of fibers 10' and 12' will not be given. The reader will note that the elements of fibers 10' and 12' are numbered identically to those of fibers 10 and 12 with the addition of apostrophes or prime designations.

Fibers 10',12' are held in anchors 40,42 which include threaded shafts 41,43 carried on platforms 44,46. As a result, anchors 40 and 42 may be raised or lowered relative to platforms 44,46. It will be appreciated that anchors for holding optical fibers 10',12' form no part of this invention per se. Such anchors are schematically shown in U.S. Pat. No. 4,557,556 and U.S. Pat. No. 4,557,557.

The anchors 40,42 firmly grip the fibers 10',12' and are spaced from the terminal ends 22',24' by a distance of about 2½ centimeters. In the embodiment of FIG. 3, the anchors 40,42 are initially placed such that the fibers 10',12' are disposed in side-by-side abutting relation to define an overlapped portion 26' having a preferred length $D_2$ of about 0.35 millimeters. The overlapped portion 26' is positioned between the electrodes 28,30. As shown in FIG. 3, the axis of X'—X' and Y'—Y' of the fiber cores 14',16' are disposed in parallel and offset relation at the location of the anchors 40,42.

The electrodes 28,30 are energized and the energy of the arc flowing between the electrodes 28,30 causes melting of the claddings 18',20' in the overlapped portion 26'. While the cladding 18',20' in the overlapped portion 26' is in a semi-liquid state, the anchors 40,42 are moved relative to one another to bring the axes X'—X' and Y'—Y' in the region of anchor locations 40,42 to be in axial alignment. (Alternately, the fiber axis X'—X' and Y'—Y' may be aligned before the arc is applied). In FIG. 3, anchor 40 is indicated by arrow A as moving in an upward direction. Anchor 42 is indicated by arrow B to be moving in a downward direction. It will be appreciated that both of anchors 40 and 42 need not be moved. All that is required is that one of the anchors 40,42 moves relative to the other anchor to cause the axes X'—X' and Y'—Y' in the region of the anchors 40,42 to be in axial alignment.

The method described above results in a fused attenuator as shown in FIG. 4. As indicated in FIG. 4, the axes X'—X' and Y'—Y' are shown in axial alignment. We have found that this fabrication method permits fabrication of an attenuator of less than 10 dB. To further reduce the loss through the attenuator, subsequent applications of energy can be applied to the region 26a' to further move the cores 14',16' closer together. After each application of energy, the transmission loss through the fibers 10',12' is measured until the desired attenuator loss is achieved. We have found that the fiber cores 14,16 at overlapping section 26 approach one another and that attenuators having a loss of as low as 5 dB are attainable with the present technique.

Figure 5:
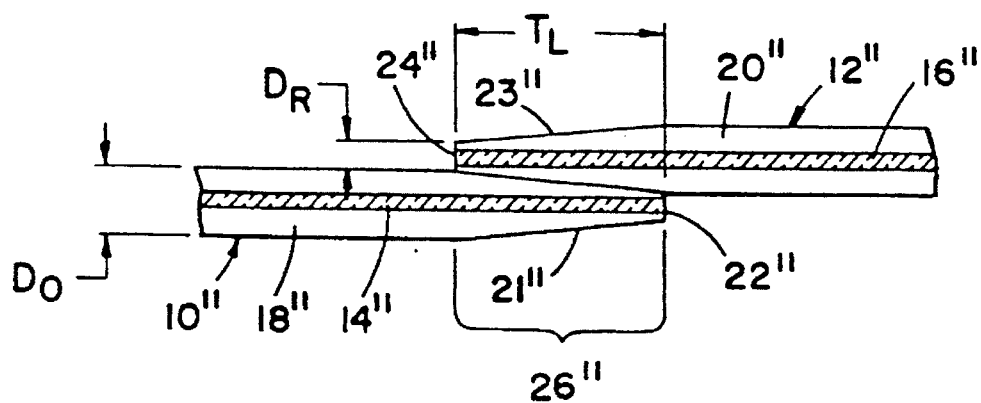
FIG. 5 is a view similar to that of FIG. 1 showing a further alternative embodiment of the present invention.

Referring now to FIG. 5, a still further embodiment of the present invention is shown. In FIG. 5, fibers 10" and 12" are shown having cores 14",16" surrounded by claddings 18" and 20". The fibers 10" and 12" are identical to fibers 10 and 12 except that at the terminal ends 22",24" fibers are provided with a reduced diameter portion in the form of a tapered areas 21" and 23" which taper the diameter of the cladding 18",20" from the full diameter $D_0$ to a reduced diameter $D_R$". In a preferred embodiment, the reduced diameter $D_R$" is about 0.5 millimeters. The length of the taper 23" is about 2 millimeters.

As shown in FIG. 5, the fibers 10" and 12" are positioned similar to that of fibers 10 and 12 with the tapered portion 21",23" disposed in overlapping relation to define the overlapped portion 26". The overlapped portion 26" is then positioned between electrodes 28,30 and energy is applied to the overlapped portion 26" to partially fuse the fibers 10", 12". After application of the energy, the amount of attenuation is measured and subsequent applications of energy followed by subsequent measurements are performed until desired attenuation is reached. Using the embodiment shown in FIG. 5, it is believed that attenuations as low as 1 dB can be obtained.

Figure 6:
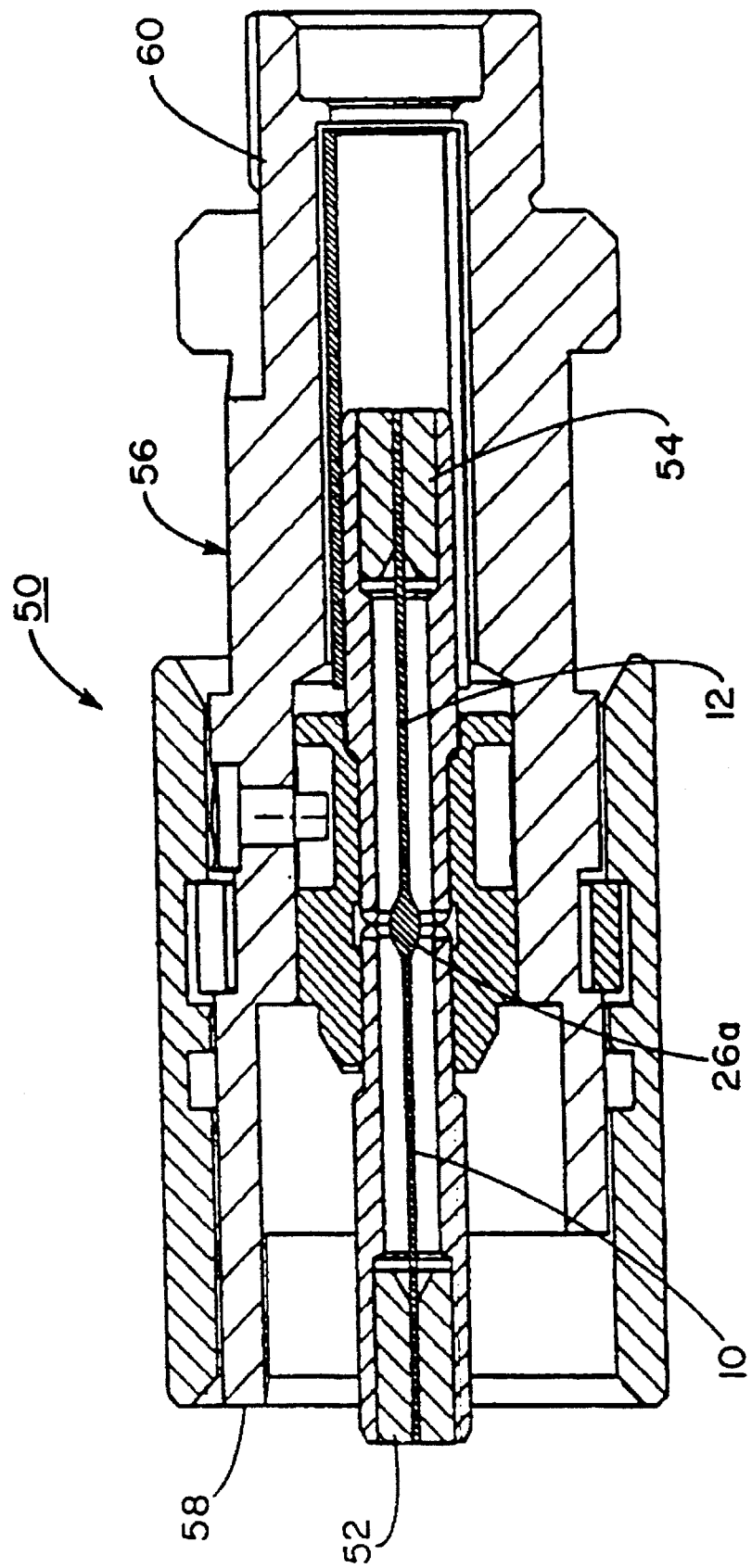
FIG. 6 is a view of an adapter incorporating a still further attenuator fabricated according to the method of the present invention.

FIG. 6 shows a preferred use of an attenuator technique according to the present invention. In FIG. 6, an adapter 50 is shown. The adapter contains fibers 10 and 12 which have been fused at a fused portion 26a to achieve a desired amount of attenuation. Each of the fibers 10,12 are retained in axially aligned ceramic ferrules 52,54. The ferrules are contained within a housing 56 which includes a first mating portion 58 and a second mating portion 60.

The adapter shown in FIG. 6 is suited for use with so called D4 connectors. D4 connectors are well known in the art and form no part of this invention per se.

The attenuator 50 may be an in-line attenuator. Namely, by producing an attenuator according to the present invention, the attenuator 50 can have any one of a plurality of selected attenuation levels. A user can simply select an attenuator 50 having a desired attenuation level and couple it with a fiber optic line to input a desired attenuation into the optical transmission line. Further, attenuators 50 having varying levels of attenuation can be connected to one another having an additive effect on their attenuation levels.

From the foregoing detailed description of the present invention, it has been shown how the objects of the invention have been attained in the preferred manner. However, modifications and equivalence of the disclosed concepts, such as those which readily occur to one skilled in the art, are intended to be included within the scope of the claims which are appended hereto.

What is claimed is:

1. A method for fabricating an optical attenuator from at least a first and a second optical fiber having first and second claddings, respectively, surrounding first and second cores, respectively, and each of said first and second fibers having longitudinally extending axes extending coaxially with said cores, said method comprising the steps of:

placing said first and second fibers with said axes of said fibers in closely-spaced overlapping relation to define an overlapped portion of said fibers;

applying thermal energy to said overlapped portion to at least partially fuse said first and second fibers at said overlapped portion; and holding said fibers for said fibers to be in general axial alignment following fusion of said overlapped portion.

2. A method according to claim 1 wherein said placing step includes disposing said fibers in side-by-side abutting relation at said overlapped portion.

3. A method according to claim 1 wherein said placing step includes placing said fibers in parallel alignment at said overlapped portion.

4. A method according to claim 1 comprising applying said energy to move said cores toward one another.

5. A method for fabricating an optical attenuator from at least a first and a second optical fiber having first and second claddings, respectively, surrounding first and second cores, respectively, and each of said first and second fibers having longitudinally extending axes extending coaxially with said cores, said method comprising the steps of:

placing said first and second fibers with said axes of said fibers in closely-spaced overlapping relation to define an overlapped portion of said fibers;

applying thermal energy to said overlapped portion to at least partially fuse said first and second fibers at said overlapped portion to form a fused overlapped portion; and measuring an attenuation through said fused overlapped portion.

6. A method according to claim 5 further comprising applying an additional application of energy to said overlapped portion after said measuring and measuring said attenuation after said additional application.

7. A method according to claim 6 further comprising performing subsequent additional applications of energy to said overlapped portion followed by subsequent additional measurement of said attenuation until a measured attenuation achieves a desired attenuation.

8. A method according to claim 5 wherein said placing includes disposing said fibers in side-by-side abutting relation at said overlapped portion.

9. A method for fabricating an optical attenuator from at least a first and a second optical fiber having first and second claddings, respectively, surrounding first and second cores, respectively, and each of said first and second fibers having longitudinally extending axes extending coaxially with said cores, said method comprising the steps of:

placing said first and second fibers with said axes of said fibers in closely-spaced overlapping relation to define an overlapped portion of said fibers;

initially applying thermal energy to said overlapped portion to at least partially fuse said first and second fibers at said overlapped portion; and wherein said placing step includes placing a first and second anchor location of said first and second fibers, respectively, in relative positioning with axes of said first and second cores offset at said first and second anchor locations;

and urging said first and second cores at said first and second anchor locations toward an axial alignment.

10. A method according to claim 9 wherein said placing includes disposing said fibers in side-by-side abutting relation at said overlapped portion.

11. A method for fabricating an optical attenuator from at least a first and a second optical fiber having first and second claddings, respectively, and each of said first and second fibers having longitudinally extending axes extending coaxially with said cores, surrounding first and second cores, respectively, said method comprising the steps of:

placing said first and second fibers with said axes of said fibers in closely-spaced overlapping relation to define an overlapped portion of said fibers;

initially applying thermal energy to said overlapped portion to at least partially fuse said first and second fibers at said overlapped portion; and forming a reduced diameter portion on at least one of said first and second claddings and, in said placing step, positioning said reduced diameter portion at said overlapped portion.

12. A method according to claim 11 wherein said placing includes disposing said fibers in side-by-side abutting relation at said overlapped portion.

13. A method for fabricating an optical attenuator from at least a first and a second optical fiber having first and second claddings, respectively, and each of said first and second fibers having longitudinally extending axes extending coaxially with said cores, surrounding first and second cores, respectively, said method comprising the steps of:

placing said first and second fibers with said axes of said fibers in closely-spaced overlapping relation to define an overlapped portion of said fibers; and applying thermal energy to said overlapped portion to at least partially fuse said first and second fibers substantially throughout said overlapped portion.

14. A method according to claim 13 wherein said placing includes disposing said fibers in side-by-side abutting relation at said overlapped portion.

15. A method for fabricating a fiber optic attenuator comprising the steps of:

providing first and second fiber segments, each segment having a first end and a second end, a portion of each segment including the first end being referred to as a first end portion, the fiber segments being characterized by a fiber diameter and the first end portions having respective radially outer surfaces;

bringing the respective first end portions of the fiber segments into a relative position such that the radially outer surfaces of the respective first end portions contact each other and the respective first end portions overlap by an axial distance greater than the fiber diameter;

heating the respective first end portions so that they assume a plastic state;

adjusting the relative axial positioning of the respective first end portions while the respective first end portions are in the plastic state to achieve a desired degree of attenuation; and cooling the respective first and end portions to form a fused splice.

16. The method of claim 15 wherein the axial distance is in the range of about 0.5–5.0 mm.

17. The method of claim 15 wherein the axial distance is in the range of 1–3 mm.

18. The method of claim 15, and further comprising the step of injecting light into the second end of the first fiber segment and monitoring the light that emerges from the second end of the second fiber segment, and wherein said adjusting step is performed in response to the monitored light.

19. A fiber optic attenuator comprising:

first and second fiber segments, each having respective first and second ends, a portion of each segment including the first end being referred to as a first end portion, said fiber segments being characterized by a fiber diameter;

said respective first end portions being fused to each other and overlapping each other in an overlap region by an axial distance that is greater than said fiber diameter, said respective second ends being located on longitudinally opposite sides of said overlap region.

20. The attenuator of claim 19 wherein said fiber segments are single-mode fiber.

21. The attenuator of claim 20 wherein the attenuator is characterized by an attenuation greater than about 3 dB.

22. The attenuator of claim 19 wherein said fiber segments are multimode fiber.

23. The attenuator of claim 22 wherein the attenuator is characterized by an attenuation greater than about 10 dB.

24. A fiber optic attenuator comprising:

first and second segments, each having respective first and second ends, a portion of each segment including the first end being referred to as a first end portion, said fiber segments being characterized by a fiber diameter and having respective cores having respective ends;

said respective first end portions being fused to each other with said ends of said cores completely encapsulated and overlapping each other in an overlap region by an axial distance that is greater than said fiber diameter, said respective second ends being located on longitudinally opposite sides of said overlap region.

25. The attenuator of claim 24 wherein said fiber segments are single-mode fiber.

26. The attenuator of claim 25 wherein the attenuator is characterized by an attenuation greater than about 3 dB.

27. The attenuator of claim 24 wherein said fiber segments are multimode fiber.

28. The attenuator of claim 27 wherein the attenuator is characterized by an attenuation greater than about 10 dB.

29. A method for fabricating a fiber optic attenuator comprising the steps of:

providing first and second fiber segments, each segment having a first end and a second end, a portion of each segment including the first end being referred to as a first end portion, the fiber segments being characterized by a fiber diameter and the first end portions having respective radially outer surfaces;

bringing the respective first end portions of the fiber segments into a relative position such that the radially outer surfaces of the respective first end portions contact each other and the respective first end portions overlap in an overlap region by an axial distance greater than the fiber diameter with said respective second ends being located on longitudinally opposite sides of said overlap region;

heating the respective first end portions so that they assume a plastic state;

adjusting the relative axial positioning of the respective first end portions while the respective first end portions are in the plastic state to achieve a desired degree of attenuation; and cooling the respective first end portions to form a fused splice.

30. The method of claim 29 wherein the axial distance is in the range of about 0.5–5.0 mm.

31. The method of claim 29 wherein the axial distance is in the range of 1–3 mm.

32. The method of claim 29, and further comprising the steps of injecting light into the second end of the first fiber segment and monitoring the light that emerges from the second end of the second fiber segment, and wherein said adjusting step is performed in response to the light, so monitored.

* * * * *